(12) United States Patent
Ghozali et al.

(10) Patent No.: US 12,233,626 B2
(45) Date of Patent: Feb. 25, 2025

(54) HEATABLE LAMINATED SIDE GLAZING

(71) Applicant: AGC GLASS EUROPE, Louvain-la-neuve (BE)

(72) Inventors: Salah Eddine Ghozali, Gosselies (BE); Charley Razzini, Gosselies (BE); Pierre Defoy, Gosselies (BE)

(73) Assignee: AGC GLASS EUROPE, Louvain-la-neuve (BE)

( * ) Notice: Subject to any disclaimer, the term of this patent is extended or adjusted under 35 U.S.C. 154(b) by 44 days.

(21) Appl. No.: 17/906,445

(22) PCT Filed: Mar. 18, 2021

(86) PCT No.: PCT/EP2021/056924
§ 371 (c)(1),
(2) Date: Sep. 15, 2022

(87) PCT Pub. No.: WO2021/185955
PCT Pub. Date: Sep. 23, 2021

(65) Prior Publication Data
US 2023/0135979 A1    May 4, 2023

(30) Foreign Application Priority Data
Mar. 20, 2020  (EP) .................................... 20164643

(51) Int. Cl.
*B32B 17/10*   (2006.01)
(52) U.S. Cl.
CPC .. *B32B 17/10192* (2013.01); *B32B 17/10036* (2013.01); *B32B 17/10238* (2013.01);
(Continued)
(58) Field of Classification Search
CPC ........ B32B 17/10192; B32B 17/10036; B32B 17/10238; B32B 2255/205;
(Continued)

(56) References Cited

U.S. PATENT DOCUMENTS

| | | | |
|---|---|---|---|
| 2004/0065651 A1* | 4/2004 | Voeltzel | B32B 17/10293 219/203 |
| 2005/0178756 A1* | 8/2005 | Degand | H05B 3/84 219/203 |

(Continued)

FOREIGN PATENT DOCUMENTS

| | | |
|---|---|---|
| WO | WO 03/105532 A1 | 12/2003 |
| WO | WO 2006/010698 A1 | 2/2006 |

(Continued)

OTHER PUBLICATIONS

International Search Report mailed on Jun. 4, 2021 in PCT/EP2021/056924 filed on Mar. 18, 2021 (citing references 1-6, 15-18, therein, 4 pages).

*Primary Examiner* — Humera N. Sheikh
*Assistant Examiner* — Kevin C T Li
(74) *Attorney, Agent, or Firm* — Oblon, McClelland, Maier & Neustadt, L.L.P.

(57) ABSTRACT

A laminated side glazing of a vehicle, with an upper edge, a lower edge, a front edge, and a rear edge, includes an outer pane and an inner pane, which panes are bonded to one another via a thermoplastic intermediate layer, and a transparent, heatable coating, which is arranged between the outer pane and the inner pane and which is electrically contacted by a first collecting busbar and a second collecting busbar and which has, for guiding a heating current flowing between the collecting busbars, at least one decoated isolating line that runs between the collecting busbars, wherein the first collecting busbar and the second collecting busbar are arranged along the front edge or the rear edge and wherein an upper part and a lower part are defined by pattern of decoated isolated lines different in the upper part and the lower part of the laminated side glazing.

20 Claims, 4 Drawing Sheets

(52) U.S. Cl.
CPC . *B32B 2255/205* (2013.01); *B32B 2264/1051* (2020.08); *B32B 2264/1055* (2020.08); *B32B 2307/302* (2013.01); *B32B 2605/006* (2013.01)

(58) Field of Classification Search
CPC .... B32B 2264/1051; B32B 2264/1055; B32B 2307/302; B32B 2605/006; B60J 1/17; H02B 2203/005; H02B 2203/011; H02B 2203/013; H02B 3/84
See application file for complete search history.

(56) References Cited

U.S. PATENT DOCUMENTS

| | | | |
|---|---|---|---|
| 2007/0108175 A1* | 5/2007 | Andrt | B32B 17/10385 |
| | | | 219/203 |
| 2008/0035629 A1* | 2/2008 | Thiry | B32B 17/10761 |
| | | | 219/203 |
| 2008/0318011 A1 | 12/2008 | Chaussade et al. | |
| 2016/0174295 A1 | 6/2016 | Klein et al. | |
| 2018/0343705 A1* | 11/2018 | Klein | B60J 1/12 |
| 2020/0215797 A1 | 7/2020 | Tondu | |

FOREIGN PATENT DOCUMENTS

| | | |
|---|---|---|
| WO | WO 2016/119950 A1 | 8/2016 |
| WO | WO 2019/053381 A1 | 3/2019 |

* cited by examiner

HEATABLE LAMINATED SIDE GLAZING

CROSS REFERENCE TO RELATED APPLICATIONS

This application is a National Stage entry under 35 U.S.C. § 371 of PCT/EP2021/056924, filed on Mar. 18, 2021, and claims priority to European Patent Application No. 20164643.7, filed on Mar. 20, 2020. The entire contents of both are incorporated herein by reference.

TECHNICAL FIELD

The invention relates to a heatable laminated side pane, a method for its production, and its use.

BACKGROUND OF THE INVENTION

Motor vehicles typically have side windows openable or not. Such side windows are provided with a side pane that can be moved by substantially vertical displacement, by which means the side window can be opened and closed.

Side panes can be designed as laminated safety panes that comprise an outer pane and an inner pane that are bonded to one another via a thermoplastic intermediate layer, typically a PVB film. Also known are heatable laminated side glazings that are equipped with heating wires. The heating wires are embedded in the thermoplastic intermediate layer. Typically, collecting busbars (also referred to as collecting conductors or busbars) are provided for the electrical contacting of the heating wires. Suitable collecting busbars are, for example, strips of a copper foil that are connected to an external voltage source.

Also known are side glazings that are heated by a transparent coating instead of by a heating wire. The coatings comprise electrically conductive layers, based in particular on silver. The coatings are likewise electrically contacted with at least two collecting busbars, between which a current flows through the heatable coating. However, due to the complex shape of side glazings, it is possible to arrange the collecting busbars parallel to one another such that a homogeneous heating field is formed in the see-through region of the pane. In order to nevertheless guide the current paths between the collecting busbars as uniformly as possible over the see-through region of the pane, it is customary to pattern the coating by means of line-shaped decoated regions. Such side glazings are known, for example, from DE102004029164A1, WO03/105533A1, and WO200601069 LA1.

The common practice, until now, has been to arrange the collecting busbars of a heatable, laminated side pane along the lower edge of the side pane, which is always covered by the motor vehicle body. Thus, the electrical contacting of the heatable pane always remains hidden. Obviously, the opinion prevails that, in the opened state of the side window, collecting busbars along side edges other than the lower edge, in particular along the front edge, are visible to the observer, a situation not well accepted for aesthetic reasons.

The prior art heatable side panes with the collecting busbars along the lower edge are not the favorite ones. The physical proximity of the two collecting busbars with opposing polarity requires complicated isolating measures to permanently prevent short circuits. Moreover, the heating wires or patterned segments of the coating must be routed meanderingly starting from the lower edge over the pane back to the lower edge in order to heat the pane over its entire surface. Such a meandering course can be undesirable for aesthetic reasons. Moreover, with sharp local bends of the heating wire, locations with local overheating can form (so-called "hotspots").

However, with the prior art heatable side glazings, the area of the front laminated side glazings near the side-view mirror is not heated in a privileged manner to defog or deice this zone to quickly have a view to side-view mirror.

The object of the present invention is to provide an improved heatable, laminated side glazing.

SUMMARY OF THE INVENTION

The object of the present invention is accomplished according to the invention by a heatable laminated side glazing as disclosed herein.

The heatable laminated side glazing according to the invention is provided for example an openable side window of a vehicle, a fixed window as a quarter lite, a back lite . . . . . An openable side window means a side window that can be opened and closed by substantially vertical displacement of the side glazing into the vehicle door.

The heatable laminated side pane has an upper edge, a lower edge, a front edge, and a rear edge. The term "upper edge" denotes the side edge of the side pane that points upward in the installed position. "Lower edge" denotes the side edge that points toward the ground in the installed position. "Front edge" denotes the side edge that is directed forward in the driving direction. "Rear edge" denotes the side edge that is directed toward the rear in the driving direction.

The heatable laminated side pane comprises at least an outer pane and an inner pane that are bonded to one another via a thermoplastic intermediate layer. "Inner pane" denotes the pane that faces the interior of the vehicle in the installed position. "Outer pane" denotes the pane that faces the external surroundings of the vehicle in the installed position.

According to the invention, a transparent, heatable coating that is electrically contacted by means of a first collecting busbar and a second collecting busbar is arranged between the outer pane and the inner pane. The collecting busbars are provided to be connected to an external voltage source such that, during operation, a heating current flows through the heatable coating between the collecting busbars. The coating thus functions as a heating layer and heats the side pane as a result of its electrical resistance, for example, to deice the side pane or to free it from moisture condensation.

The heatable coating has, for guiding the heating current, at least one decoated isolating line, usually a plurality of decoated isolating lines. In the context of the invention, the term "isolating line" means a line-shaped region that is not electrically conductive within the electrically conductive coating. The isolating line preferably extends over the entire thickness of the electrically conductive coating, but at least over the entire thickness of the electrically conductive layer(s) of the coating. The isolating line is preferably introduced into the electrically conductive coating by means of a laser and produced by laser-induced degeneration within the electrically conductive coating. Such laser-induced degeneration is, for example, ablation of the electrically conductive layer or a chemical modification of the electrically conductive layer. By means of the laser-induced degeneration, an interruption of the electrical conductivity of the layer is achieved. The isolating line can, however, in principle, also be formed by other methods, for example, mechanical abrasion or by masking.

The present invention concerns a heatable laminated side glazing of a vehicle, with an curved upper edge (U), a lower edge (L), a first lateral side edge (S1), and a second lateral side edge (S2) at the opposite side of the first lateral side edge (S1), at least comprising an outer pane (1) and an inner pane (2), which outer (1) and inner (2) panes are bonded to one another via a thermoplastic intermediate layer (3), and a transparent, heatable coating (4), which is arranged between the outer pane (1) and the inner pane (2)

and which is electrically contacted by a first busbar (bb1) having a height H1 arranged along the first lateral side edge (S1) and a second busbar (bb2)) having a height H2 arranged along the second lateral side edge (S2), and which has, for guiding a heating current flowing between the first and second busbars (bb1, bb2), a plurality of decoated isolating lines (L) that run between the first and second busbars (bb1, bb2), the height H1 of the first lateral side edge (S1) being smaller than the height H2 of the second lateral side edge (S2), and having an Upper part (UP) delimited by a frame-edge line L1(0) in the vicinity of the curved upper glass edge (U) and parallel to the upper edge (U) and a line (LD) drawn from the lower corner (C) of the front edge S1 of the side glazing to extend to the second lateral side edge (S2), the line (LD) being parallel to the frame-edge line L1(0), and a lower part (LP) delimited by the line (LD) and the line L2 (n), which is the last line of the last active strip and parallel to line (LD), the said upper part (UP) having a height higher than the height H1 of the first busbar (bb1) and having as a upper limit the curved line L1(0) and the lower part (LP) having a height higher than (height H2 minus height H1) and having as a upper limit the curved line L1(0);

wherein in the upper part (UP), n number of consecutive decoated isolated lines parallel to the upper edge (U) separated by a distance from 5 mm to 100 mm and having the same width are provided, wherein n is comprised between 1 to 100 and Wherein in the lower part (LP), there are alternating active and passive coated strips (i), the passive coating strips being delimited by closed decoated line (L), the active coating strips (i) having a width defined by the following formula:

$$W(i)=L2(i)^2/L2(0)^2 \times W0$$

Wherein:
W(i): width of the active coated strip
L2(i): length of the lower side of the (i) active coated strip
L2(0): length of the strip in the upper part (UP)
W0: width of the decoated lines in the upper part
And the passive coating having a width defined by the following formula:

$$D(i)=W0-W(i)-D(0)$$

D(0): width of a decoated line,
the length and the width being expressed in mm.

Thanks to the present invention and the particular design of coated/decoated lines in the upper part and the lower part of the laminated side glazing allows to have a homogenous heat distribution despite the complex shape of the laminated side glazing and the curved line L1(0). More particularly, the present invention allows to control the heating in the front edge of the side pane ie for the front side glazing in the area closed to the side-view mirror.

The invention is based on the creation of passive area within the coating provided in the laminated side glazing with isolating lines (decoates lines).

In the upper part of the laminated side glazing, the isolating lines run between the collecting busbars without interruption from the first collecting busbar to the second collecting busbar. The electrically conductive coating is divided by the isolating lines into different segments separated from one another, which are also referred to in the following as heating strips. Thus, in the upper part, delimited by a frame-edge line L1(0) in the vicinity of the curved upper glass edge (U) and parallel to the upper edge (U) and a line (LD) drawn from the lower corner (C) of the front edge S1 of the side glazing to extend to the second lateral side edge (S2), the line (LD) being parallel to the frame-edge line L1(0), there is a succession of coated, decoated lines each parallel to the the line L1(0). According to the invention, the line L1(0) is near the curved upper glass edge (U) and parallel to the upper edge (U) and delimit the frame-like edge region of the coating provided in the glazing. The said upper part (UP) having a height higher than the height H1 of the first busbar (bb1) and having as a upper limit the curved line L1(0) and the lower part (LP) having a height higher than (height H2 minus height H1) and having as a upper limit the curved line L1(0).

Due to the complex shape of side panes, at least a portion of the isolating lines will typically not run in a completely straight line between the collecting busbars, in order to distribute the heating effect as much as possible over the entire pane. Thus, the isolating lines will have, near the typically curved upper edge, a slight bend parallel to the upper edge.

According to the present invention, in the upper part (UP) of the laminated side glazing, n number of consecutive decoated isolated lines parallel to the upper edge (U) separated by a distance from 5 mm to 100 mm and having the same width are provided, wherein n is comprised between 1 to 100. This is advantageous as well in terms of the visual inconspicuousness of the isolating lines. Moreover, effective heating power is ensured by heating strips of this width.

In the lower part of the laminated side glazing, there are alternating active and passive coated strips (i), the passive coating strips (i) being delimited by closed decoated line, the active coated strips (i) having a width defined by the following formula:

$$W(i)=L2(i)^2/L2(0)^2 \times W0$$

Wherein:
W(i): width of the active coated strip
L2(i): length of the lower side of the (i) coated strip
L2(0): length of the strip in the upper part (UP)
W0: width of the decoated lines in the upper part
And the passive coating having a width defined by the following formula:

$$D(i)=W0-W(i)-D(0)$$

D(0): width of a decoated line, the length and the width being expressed in mm.

In the lower part of the laminated side glazing, the coating has a pattern defined by are alternating active and passive coated strips, the passive coating strips being delimited by closed decoated line, the active coating strips are as defined above.

According to the present invention, the width W0 of the decoated lines in the upper part will define the width W(i) of the active coated strip.

The current flow between the collecting busbars occurs only within the respective heating strips while adjacent heating strips are electrically isolated from one another and, consequently, no current flow can occur between adjacent heating strips. These heating strips make it possible to selectively shape the path of the current flow between the first collecting busbar and the second collecting busbar, which is necessary due to the complex shapes of conventional side windows to ensure homogeneous current distribution and, hence, heating effect.

According to one preferred embodiment of the present invention, the first collecting busbar and the second collecting busbar are arranged along the front edge or the rear edge of the side pane. In the context of the invention, a collecting busbar is arranged along a side edge when it is less distant from the side edge (the mean distance to said side edge is less than to all other side edges) and its lengthwise direction substantially follows the direction of the side edge.

According to a preferred embodiment of the present invention, collecting busbars can be arranged vertically along the front edge and the rear edge of a side pane without being visible to the observer in the opened state of the pane.

In an advantageous embodiment, all isolating lines run between the collecting busbar along the front edge and the collecting busbar along the rear edge. By means of the consistent course of all isolating lines between the front and the rear edge, a particularly advantageous distribution of the heating effect is achieved. Furthermore, the pattern of decoated lines in the upper part and the lower part of the laminated glazing allows to concentrate the heating in particular area as for example for the front side glazing, the area close to the side-view mirror.

According to the present invention, the frame-edge line L1(0) near the curved upper glass edge and parallel to the upper edge of the laminated side glazing is defined as the end of the coating surface of the glazing. A frame-like edge region define, here called for the upper edge of the glazing frame-edge line L1(0), of the glazing is preferably not provided with the heatable coating. This edge region is frequently also referred to as an edge deletion (decoating) (in the case of a coating applied on a pane) or a cut-back (in the case of a coating on a carrier film). This ensures that the heatable coating has no contact with the surrounding atmosphere, by which means corrosion is prevented—the coating is, so to speak, encapsulated in the intermediate layer. The width of the coating-free edge region is typically from 0.5 mm to 20 mm, in particular from 1 mm to 10 mm. The glazing can also include other uncoated regions, for example, data transmission windows or communication windows.

In an advantageous embodiment, the maximum distance of the collecting busbars from the side edge along which they are arranged is less than 3 cm, preferably less than 2.5 cm, particularly preferably less than 2 cm. In the context of the invention, the maximum distance is measured between the side edge of the side pane and the edge of the collecting busbar facing away from it. This distance is sufficiently small such that the collecting busbars are arranged with the electrical contacting in a region that is covered by vehicle body parts and sealing lips of typical motor vehicle side windows. It has surprisingly been found that with these distances the collecting busbars remain advantageously concealed behind parts of the body of a typical vehicle. Consequently, the distances indicated can be considered, so to speak, as general design teaching independent of the specific motor vehicle type.

The collecting busbars must, however, not be positioned too close to the side edge since, otherwise, the bonding of the panes is disturbed and air can penetrate into the laminate via the side edge. In an advantageous embodiment, the minimum distance of the collecting busbars from the side edge along which they are arranged is greater than 3 mm, preferably greater than 5 mm. Good results are thus achieved. In the context of the invention, the minimum distance is measured between the side edge of the side pane and the edge of the collecting busbar facing it.

In a preferred embodiment, one collecting busbar is arranged vertically along the front edge and extend at least partially along the lower edge and the other collecting busbar is arranged along the rear edge of the side pane. Thus, the available non-visible regions of the side pane are optimally used. In addition, the isolating lines can be routed without sharp bends and loops from the front edge to the rear edge, which is aesthetically appealing, facilitates homogeneous distribution of the heating power, and reduces the risk of local overheating. According to the present invention, the one collecting busbar is arranged vertically along the front edge and extend at least partially along the lower edge till the intersection of the lower edge and the last line L2(n) of last active strip W(n).

The heatable coating can be applied on a surface of the inner pane or of the outer pane. The coating is advantageously applied on a surface of the outer pane or of the inner pane facing the intermediate layer, because, there, it is protected against corrosion and other damage. It is also providing electrical insulation in the case of contact with the glass.

Alternatively, the heatable coating can be arranged on a polymeric carrier film within the intermediate layer. The carrier film preferably contains at least polyethylene terephthalate (PET), polyethylene (PE), or mixtures or copolymers or derivatives thereof. This is particularly advantageous for the handling, the stability, and the optical properties of the carrier film. The carrier film preferably has a thickness of 5 µm to 500 µm, particularly preferably of 10 µm to 200 µm, and most particularly preferably of 12 µm to 75 µm. Carrier layers with these thicknesses can be advantageously provided in the form of flexible and, at the same time, stable films, that can be easily handled.

According to the invention, the heatable coating is transparent. In the context of the invention, a "transparent coating" means a coating that has, in the visible spectral range, transmittance of at least 50%, preferably at least 70%.

The electrically conductive coating has at least one electrically conductive layer. The coating can additionally have dielectric layers, which serve, for example, for regulation of the sheet resistance, for corrosion protection, or for reducing reflection. The conductive layer preferably contains silver or an electrically conductive oxide (transparent conductive oxide, TCO), such as indium tin oxide (ITO). The conductive layer preferably has a thickness of 10 nm to 200 nm. Thus, a good compromise between transparency and electrical conductivity of the layer is achieved. To improve the conductivity with, at the same time, high transparency, the coating can have a plurality of electrically conductive layers, which are separated from one another by at least one dielectric layer. The conductive coating can include, for example, two, three, or four electrically conductive layers. Typical dielectric layers contain oxides or nitrides, for example, silicon nitride, silicon oxide, aluminum nitride, aluminum oxide, zinc oxide, or titanium oxide.

In a particularly preferred embodiment, the electrically conductive coating has at least one electrically conductive layer, which contains silver, preferably at least 99% silver. The layer thickness of the electrically conductive layer is preferably from 5 nm to 50 nm, particularly preferably from 10 nm to 30 nm. The coating preferably has two or three of these conductive layers, which are separated from one another by at least one dielectric layer. Such coatings are particularly advantageous in terms of the transparency of the pane, on the one hand, and its conductivity, on the other.

In the lower part of the laminated glazing, the width of the isolating lines is preferably less than or equal to 500 μm, particularly preferably from 10 μm to 250 μm, most particularly preferably from 20 μm to 150 μm. Isolating lines with this width can be produced easily, in particular by laser processing, ensure the electrical isolation of adjacent heating strips, and are, moreover, visually inconspicuous.

The heatable coating typically has a plurality of isolating lines, i.e., at least two isolating lines. The exact number and distance between the isolating lines depends in the individual case on the exact shape of the pane and can be determined by the person skilled in the art by preliminary considerations and simulations. The aforementioned values are suitable in particular for side panes of passenger cars. However, for larger side panes, for example, of trucks, significantly larger distances can be selected, for example, from 5 cm to 30 cm. The number of isolating lines is typically from 2 to 10, in particular from 3 to 7. In one embodiment of the invention, all heating strips have the same width. The isolating lines are then advantageously distributed uniformly and inconspicuously over the pane.

In an advantageous embodiment of the invention, the heating power (surface power density PS) increases from the rear edge to the front edge at least in sections. As a result, the electrical current in the front region of the pane is distributed over a smaller heating strip width than in the rear region, by which means the heating power is increased. A higher heating power in the front pane region can be desirable for front side panes. The front side pane region can thus be freed of ice or moisture more quickly, as a result of which the view of the side mirrors is cleared more quickly. Preferably, the maximum width of progressively narrowing heat strips is from 55 mm to 110 mm (preferably from 60 mm to 100 mm), the minimum width is from 10 mm to 55 mm (preferably from 10 mm to 50 mm). With these values, a good compromise between quick deicing in the front region in order to quickly clear the view of the side mirrors and the deicing of the entire pane, which is also important in the context of traffic safety.

In an advantageous embodiment of the invention, the average heating power (surface power density PS) of the pane is at least 250 W/m$^2$, preferably at least 300 W/m$^2$, particularly preferably at least 350 W/m$^2$. More generally, the heating power is comprised between 250 and 2000 W/m$^2$. Advantageous heating action is thus achieved.

In an advantageous embodiment, the collecting busbars are implemented as strips of an electrically conductive foil. The conductive foil preferably contains aluminum, copper, tinned copper, gold, silver, zinc, tungsten, and/or tin or alloys thereof, particularly preferably copper. The thickness of the electrically conductive foil is preferably from 10 μm to 500 μm, particularly preferably from 30 μm to 200 μm, for example, 50 μm or 100 μm. Collecting busbars made of electrically conductive foils with these thicknesses are technically simple to realize and have an advantageous current carrying capacity. The electrically conductive foil can be electrically conductively connected to the heatable coating directly via a soldering compound or an electrically conductive adhesive. Collecting busbars comprising strips of a conductive foil are suitable in particular when the electrically conductive coating is arranged on a carrier film in the intermediate layer, but can also be used with coatings on a pane surface. To improve the conducting connection, a silver-containing paste can, for example, be arranged between the conductive coating and collecting busbar.

In an alternative advantageous embodiment, the collecting busbars are implemented as a printed and fired conductive structure. The printed collecting busbars contain at least one metal, preferably silver. The electrical conductivity is preferably realized through metal particles contained in the collecting conductor, particularly preferably through silver particles. The metal particles can be situated in an organic and/or inorganic matrix such as pastes or inks, preferably as a fired screen printing paste with glass frits. The layer thickness of the printed collecting busbars is preferably from 5 μm to 40 μm, particularly preferably from L μm to 20 μm, and most particularly preferably from 10 μm to 15 μm. Printed collecting busbars with these thicknesses are technically easy to realize and have advantageous current-carrying capacity. Printed collecting busbars are suitable in particular when the electrically conductive coating is applied on a surface of the outer pane or of the inner pane.

The length of the collecting busbars depends on the design of the side pane, in particular on the length of the edge along which the collecting busbar is arranged, and can be appropriately selected in the individual case by the person skilled in the art. The "length" of the typically strip-shaped collecting busbars means their longer dimension, along which they are customarily contacted with the different heating strips sections.

The heating power can be influenced at a given applied voltage U (usually specified by the vehicle manufacturer) and sheet resistance RS and length of the collecting busbars by the width of the collecting busbars. Good results are usually obtained in a collecting busbar width range from 1 mm to 20 mm, preferably from 2 mm to 10 mm.

In a preferred embodiment of the invention, the connection of the connecting cable to the external voltage supply is done in the region of the lower edge. Thus, the connecting cables can be hidden in the motor vehicle body.

The supply line can be implemented, like the collecting busbars, preferably as strips of an electrically conductive film or as fired printing paste. In one embodiment, the collecting busbars and the supply lines are formed from the same material, which simplifies the production of the pane and is optimum for the transfer of electricity between the collecting busbar and the supply line (because of the same electrical resistance). It is, however, also possible to contact collecting busbars formed by screen printing using conductive films as connecting elements.

The sheet resistance of the electrically conductive coating is preferably from 0.3 ohm/square to 500 ohm/square. More preferably, the sheet resistance of the electrically conductive coating is from 0.3 ohm/square to 100 ohm/square. Thus, advantageous heating powers are obtained with voltages customarily used in the automotive sector, with low sheet resistances resulting in higher heating power with application of the same voltage.

The outer pane and/or the inner pane preferably contains glass, in particular soda lime glass, or plastics, preferably rigid plastics, in particular polycarbonate, or polymethyl methacrylate.

The thickness of the panes can vary widely and thus be ideally adapted to the requirements in the individual case. Preferably, these thicknesses of the outer pane and of the inner pane are from 0.5 mm to 10 mm and preferably from 1 mm to 5 mm, most particularly preferably from 1.4 mm to 3 mm.

The outer pane, the inner pane, or the intermediate layer can be clear and colorless, but also tinted, opacified, or colored. The outer outer pane and the inner pane can be made of non-prestressed, partially prestressed, or pre-stressed glass.

The intermediate layer is formed by at least one thermoplastic bonding film. The thermoplastic bonding film contains at least one thermoplastic polymer, preferably ethylene vinyl acetate (EVA), polyvinyl butyral (PVB), or polyurethane (PU) or mixtures or copolymers or derivatives thereof, particularly preferably PVB. The thickness of the thermoplastic bonding film is preferably from 0.2 mm to 2 mm, particularly preferably from 0.3 mm to 1 mm, for example, 0.3 L mm or 0.76 mm.

If the heatable coating is arranged on a carrier film, this carrier film is preferably arranged between two thermoplastic bonding films. The intermediate layer then comprises at least two thermoplastic bonding films and a carrier film with an electrically heatable coating arranged there between.

Typical heatable coatings also have infrared-(IR)-reflecting properties. Consequently, not only the heating function but, at the same time, an IR-reflecting functionality is provided by the coating according to the invention. Thermal comfort is improved by the reduced entry of thermal radiation into the vehicle interior.

The invention further includes a method for producing a heatable laminated side pane according to the invention, at least comprising
(a) Providing the outer pane, the inner pane, and the intermediate layer,
(b) Providing the heatable coating on a surface of the outer pane or of the inner pane or on a carrier film,
(c) Introducing the isolating lines in the heatable coating,
(d) Contacting the heatable coating using the collecting busbars,
(e) Arranging the intermediate layer between an outer pane and an inner pane,
(f) Bonding the outer pane to the inner pane via the intermediate layer by lamination.

If the coating is applied on a surface of one of the panes, the stack is arranged in step (e) such that the coating faces the intermediate layer. If the coating is provided on a carrier film, this carrier film is preferably arranged in step (e) between a first thermoplastic film and a second thermoplastic film. Together with the carrier film, the thermoplastic films form the intermediate layer.

The heatable coating is applied using methods known per se. Preferably, the coating is done by magnetic field enhanced cathodic sputtering. This is particularly advantageous in terms of simple, quick, economical, and uniform coating of the substrate. Carrier films with heatable coatings are also commercially available such that the coated carrier film does not have to be produced in-house.

The introduction of the isolating lines is preferably done by laser processing, but can, in principle, also be done using other methods, for example, mechanical abrasion, or by masking. The patterning of conductive layers is well known to the person skilled in the art.

The mounting of the collecting busbars can be done, in particular, by placement, printing, soldering, or gluing.

The production of the composite glass by lamination is done with customary methods known per se to the person skilled in the art, for example, autoclave methods, vacuum bag methods, vacuum ring methods, calendar methods, vacuum laminators, or combinations thereof. The bonding of the outer pane and the inner pane is customarily done through the action of heat, vacuum, and/or pressure.

The side glazing according to the invention is preferably used in means of transportation for travel on land, in the air, or on water, in particular in motor vehicles.

BRIEF DESCRIPTION OF THE SEVERAL VIEWS OF THE DRAWINGS

In the following, the invention is described in detail with reference to drawings and exemplary embodiments. The drawings are schematic representations and not true to scale. The drawings in no way restrict the invention.

They depict.

DETAILED DESCRIPTION OF THE INVENTION

Figure 1:
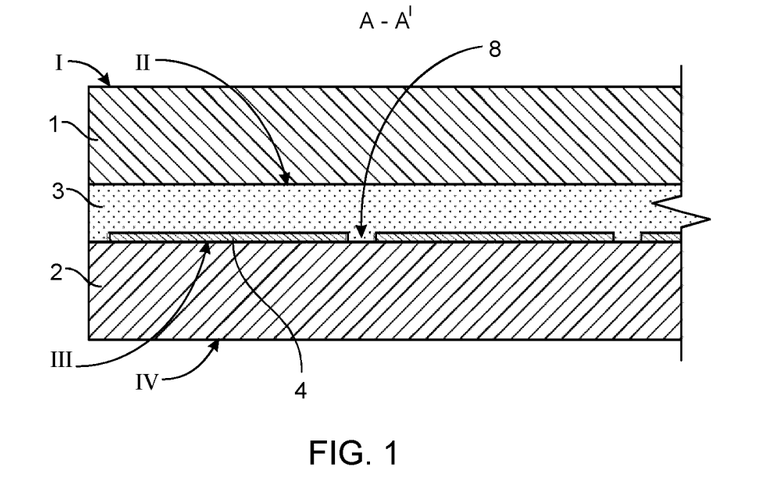
FIG. 1 a section along A-A' through the side pane of FIG. 1.

The side pane is a laminated glass composed of an outer pane 1, an inner pane 2, and an intermediate layer 3 that bonds the two planes to one another. The outer pane 1 and the inner pane 2 are made of soda lime glass and have, for example, a thickness, in each case, of 2.1 mm. The intermediate layer 3 is formed by a film made of PVB with a thickness of 0.76 mm.

The outer pane 1 has an outer surface I and an inner surface II. The inner pane 2 likewise has an outer surface III and an inner surface IV. The term "outer surface" refers to the surface that is intended to be turned toward the external environment in the installed position. The term "inner surface" refers to the surface that is intended to be turned toward the vehicle interior in the installed position. The inner surface II of the outer pane 1 and the outer surface III of the inner pane 2 are turned toward one another and the intermediate layer 3.

Figure 2:
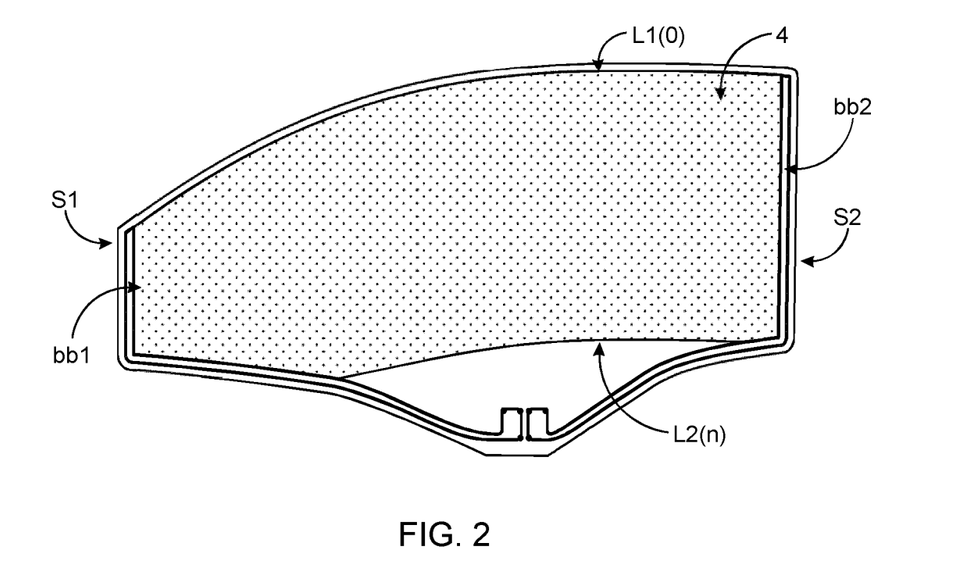
FIG. 2 a plan view of an embodiment of the side pane according to the invention, FIG. 3-1 a plan view of the side pane according to the invention showing the upper and lower part of an embodiment of the side pane according to the invention FIG. 3-2 a plan view of an embodiment of the pattern of decoating lines in the upper part of a side pane according to the invention FIG. 4-1 an enlarged view of the alternating active and passive coated strips (i), in the lower part of an embodiment of the side pane according to the invention, FIG. 4-2 an detailed view of the FIG. 4-1 showing the alternating active and passive coated strips (i), in the lower part of an embodiment of the side pane according to the invention, FIG. 5 a plan view of an embodiment of the pattern of isolating lines in the upper and the lower part of the side pane according to the invention.

A transparent, heatable coating 4 is applied on the outer surface III of the inner pane 2 as shown in the FIG. 2. It is understood that the heatable coating 4 may be applied on the inner surface II of the outer pane 1. The heatable coating has, for example, two silver layers and further dielectric layers above, below, and between the silver layers to increase transparency and reduce sheet resistance. For generating the heating action, the coating 4 is electrically contacted by means of a first collecting busbar bb1 and a second collecting busbar bb2. The collecting busbars bb1, bb2 are, for example, formed by a printed and fired screen printing paste containing silver particles and glass frits and have a width of L mm and a thickness of 100 μm. When a voltage is applied to the collecting busbars bb1, bb2, a current flows through the coating 4, creating the heating action. The voltage can be the usual motor vehicle on-board voltage of 14 V, or even a voltage of, for example, 42 V or 4 L V. The heatable coating 4 is delimited by frame-edge line L1(0) in the vicinity of the curved upper glass edge (U) and parallel to the upper edge (U), and the line L2 (n), which is the last line of the last active strip and parallel to the line (LD) according to the present invention.

Figure 31:
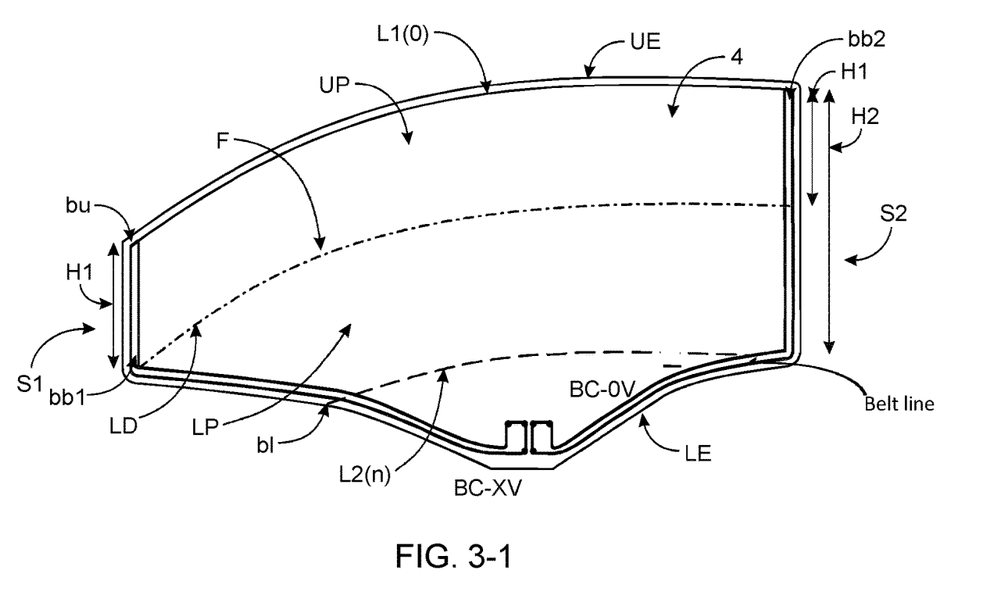
Figure 32:
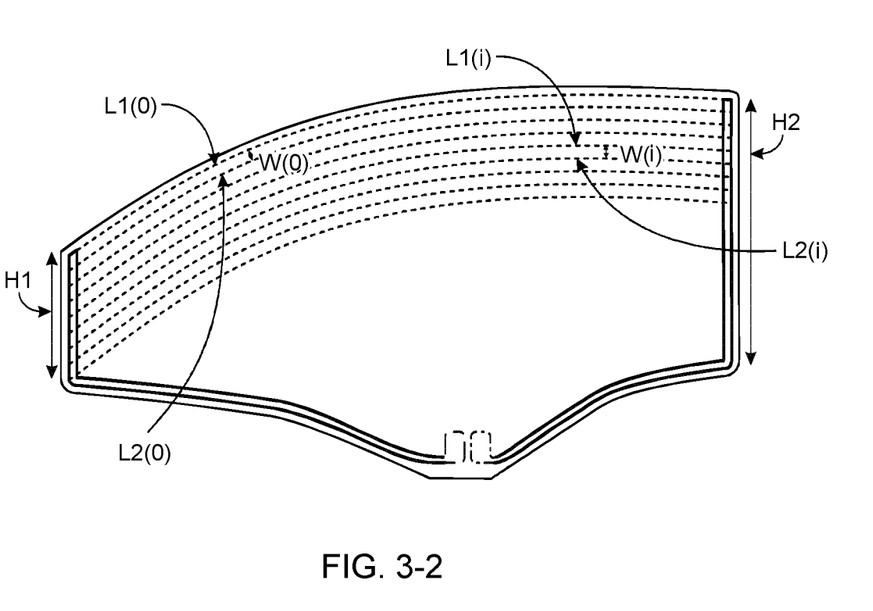

FIG. 3-1 and FIG. 3-2 depict in each case a detail of an embodiment of the heatable laminated side glazing according to the invention. The side pane for the front side window of an automobile which can be opened by lowering the side pane. The side pane has a front edge S1, a rear edge S2, an upper edge UE, and a lower edge LE. The edges are referred to according to the installed position in the direction of travel.

The laminated side glazing and more particularly the heatable coating are divided in 2 parts, the upper part UP and the lower part LP, the upper part (UP) being delimited by a frame-edge line L1(0) in the vicinity of the curved upper glass edge (U) and parallel to the upper edge (U) and a line (L) drawn from the lower corner (C) of the front edge S1 of the side glazing to extend to the second lateral side edge (S2), the line (LD) being parallel to the frame-edge line L1(0). The lower part (LP) is delimited by the line (LD) and the line L2 (n), which is the last line of the last active strip and parallel to line (LD) according to the present invention.

The pattern of isolating lines L within heatable coating 4 in the upper part UP and the lower part LP are designed to have a homogeneous heating of the laminated side glazing with a concentration of the heating in required zones as side-view mirror.

The heatable coating 4 is divided by isolating lines L into different segments (heating strips (i)). This serves to guide the heating current, enabling the most homogeneous heating of the pane possible. Otherwise, due to the complex shape of typical side panes substantial parts of the pane remain unheated since the current would take the shortest path between the collecting busbars bb1, bb2.

The first collecting busbar bb1 runs along the front edge S1 of the side pane; the second collecting busbar bb2 runs along the rear edge S2, the height H1 of the first collecting busbar bb1 is smaller than the the height H2 of the first collecting busbar bb2. In the present embodiment, the collecting busbars bb1 and bb2 are provided vertically along respectively the front edge S1 and rear edge S2 and extend to the lower part of the laminated glazing as shown in FIG. 3-1. It is understood that the collecting busbars may be disposed in a different way to allow a homogenous heating accordingly to the complex shape of the laminated glazing. The maximum distance of the collecting busbars from the edge along which they run is, for example, 2 cm. The collecting busbars bb1, bb2 are not visible to an observer even in the opened state of the side window. The collecting busbars bb1, bb2 are covered by auto body parts and sealing lips of typical side windows. The minimum distance is, for example, 6 mm. This distance is sufficient to prevent disruption of the stability of the laminate and penetration of air.

In the upper part of the laminated glazing, as shown in FIG. 3-2, the isolating lines L run from the first collecting busbar bb1 to the second collecting busbar bb2. The isolating lines L are parallel to the frame-edge line L1(0). In the FIG. 3-2, the features are as follows;

line L1(i) represents the length of upper curve of the (i) strip

L2(i) represents the length of the lower curve of the (i) strip

W(i) represents the width of the (i) strip

D(i) represents the distance between the (i−1) active strip, means the previous active strip and the (i) active strip (i) represents the strip with a number comprised between 2 and 99.

Figure 41:
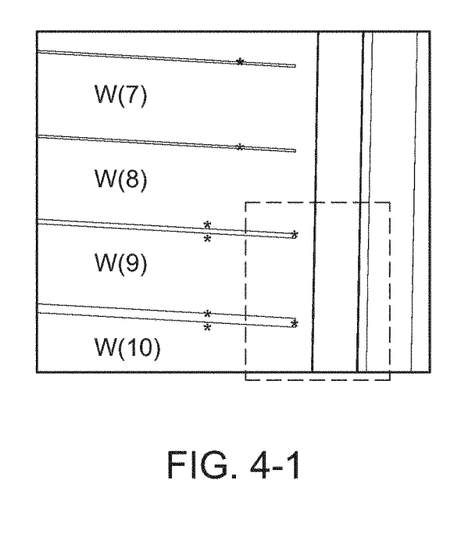
Figure 42:
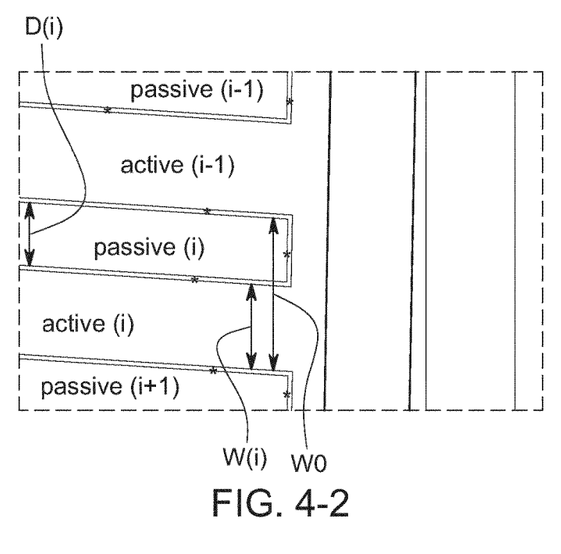

In FIG. 4-1 and FIG. 4-2, the feature "*" represents the decoating lines with the first with of decoating line DO comprised between 0.05 mm to 0.5 mm according to one embodiment of the present invention and $$D(i)=W0-W(i)+D0$$

$$\text{Passive strip}(i)=D(i)-2\times D0$$

Thus, local hotspots can be prevented. In addition, the design is visually appealing. The isolating lines L have only a slight curvature that increases as the distance from the upper edge UE decreases. Thus, despite the complex pane shape with the curved upper edge UE, uniform distribution of the heating power is obtained.

Figure 5:
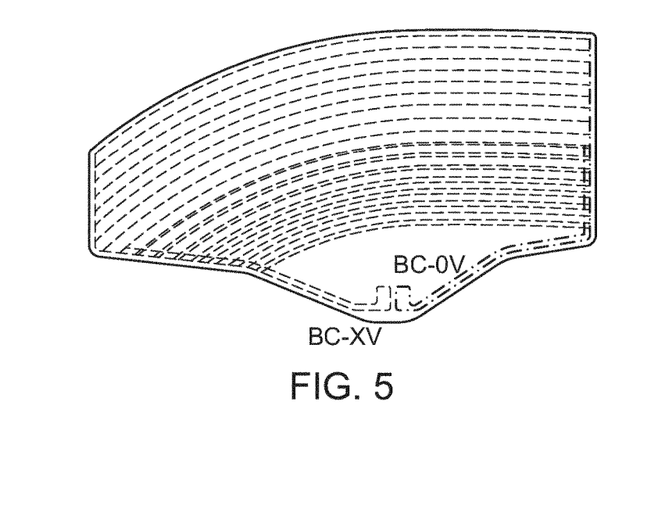

The FIG. 5 shows an embodiment of the pattern of isolating lines in the upper and the lower part of the side pane according to the invention. The different pattern in the upper and lower parts of the glazing according to the present invention, allows to improve the heating of the glazing and also the uniformity of the heating.

According to the present invention, the heating may be more located to "side mirror zone" in order to deice, to-frog this zone more quickly than the other part of the glazing to have quicker access to the view from the side mirrors.

According to one embodiment of the present invention, the distance between adjacent isolating lines (L) in the upper part (UP) is constant or variable from the second lateral side (S2) to the first lateral side (S1) from a distance comprised between 1 mm to 110 mm and preferably between 1 mm and 100 mm and more preferably between 1 mm and 50 mm and more preferably between 1 mm and 30 mm. Thus, the heating may concentrated to a particular zone such as side mirror zone.

The distance between adjacent isolating lines L (in other words, the width of the heating strips) remains in the course from the rear edge S2 to the front edge S1. Thus, higher heating power is achieved in the region of the front edge S1. Consequently, this region is deiced or freed of moisture first, as a result of which the driver quickly obtains a clear view of the side mirror.

LIST OF REFERENCE CHARACTERS 1 outer pane
2 inner pane
3 thermoplastic intermediate layer
4 heatable coating
bb1 first collecting busbar
bb1 second collecting busbar
7 supply line
L isolating line, decoated line
L1(0) First line of the edge-frame coating
S2 rear edge of the side pane
UE upper edge of the side pane
S1 front edge of the side pane
LE lower edge of the side pane
UP upper part
LP lower part BL intersection of LE and L2(n).
LD line delimiting the upper and lower parts
L2(n) Last line of the last active strip
C lower corner of the front edge S1 of the side glazing
I outer surface of the outer pane 1
II inner surface of the outer pane 1
III outer surface of the inner pane 2
IV inner surface of the inner pane 2
(i) active strip

The invention claimed is:

1. A heatable laminated side glazing, with a curved upper edge, a lower edge, a first lateral side edge, and a second lateral side edge at an opposite side of the first lateral side edge, the heatable laminated side glazing comprising
an outer pane and an inner pane, which outer and inner panes are bonded to one another via a thermoplastic intermediate layer; and
a transparent, heatable coating, which is arranged between the outer pane and the inner pane, and which is electrically contacted by a first busbar having a height (H1) arranged along the first lateral side edge and a second busbar having a height (H2) arranged along the second lateral side edge, and which has, for guiding a heating current flowing between the first and second busbars, a plurality of decoated isolating lines (L) that run between the first and second busbars, the height (H1) of the first lateral side edge being smaller than the height (H2) of the second lateral side edge, the coating having an upper part delimited by a frame-edge line (L1(0)) in a vicinity of the curved upper edge and parallel to the curved upper edge and a line (LD) drawn from a lower corner of the first lateral side edge of the side glazing to extend to the second lateral side edge, the line (LD) being parallel to the frame-edge line (L1(0)), and a lower part delimited by the line (LD) and a line (L2(n)), which is a last line of a last active strip and parallel to the line (LD),
the upper part having a height higher than the height (H1) of the first busbar and having as an upper limit the frame-edge line (L1(0)) and the lower part having a height higher than height (H2) minus height (H1) and having as an upper limit the frame-edge line (L1(0));
wherein in the upper part, n number of consecutive decoated isolated lines parallel to the upper edge separated by a distance from 5 mm to 100 mm and having a same width are provided, wherein n is between 1 to 100, and
wherein in the lower part, there are alternating active and passive coated strips, the passive coating strips (i) being delimited by closed decoated line (L), the active coating strips (i) having a width defined by the formula:

$$W(i)=L2(i)^2/L2(0)^2 \times W0$$

wherein:
W(i): width of the active coated strip
L2(i): length of the lower side of the (i) active coated strip
L2(0): length of the strip in the upper part
W0: width of the decoated lines in the upper part
and the passive coating strips (i) having a width defined by the formula:

$$D(i)=W0-W(i)-D(0)$$

D(0): width of a decoating line.

2. A heatable laminated side glazing according to claim 1, wherein the first side lateral edge has a height between 100 mm and 1000 mm.

3. A heatable laminated side glazing according to claim 2, wherein the second side lateral edge has a height between 100 mm and 1000 mm.

4. A heatable laminated side glazing according to claim 2, wherein D(0) has a width between 0.05 mm and 2 mm.

5. A heatable laminated side glazing according to claim 2, wherein the heating power increases, at least in sections, from the second lateral side edge to the first lateral side edge.

6. A heatable laminated side glazing according to claim 3, wherein the distance between adjacent isolating lines (L) in the upper part is constant or variable from the second lateral side edge to the first lateral side edge and is between 1 mm to 110 mm.

7. A heatable laminated side glazing according to claim 1, wherein a distance of the first and second busbars from the first lateral side edge and the second lateral side edge is respectively greater than 3 mm.

8. A heatable laminated side glazing according to claim 1, wherein the heatable coating is applied on a surface of the outer pane or of the inner pane facing the intermediate layer or on a polymeric carrier film within the intermediate layer.

9. A heatable laminated side glazing according to claim 1, wherein the heatable coating comprises at least one electrically conductive layer, which comprises silver and has a thickness of 10 nm to 50 nm.

10. A heatable laminated side glazing according to claim 1, wherein the first and second busbars are implemented as strips of an electrically conductive film, comprising copper, or as fired screen-printing paste, comprising silver particles.

11. A heatable laminated side glazing according to claim 1, wherein a width of the first and second busbars is from 1 mm to 20 mm.

12. A method for producing a heatable laminated side pane according to claim 1 comprising:
(a) providing the outer pane, the inner pane, and the intermediate layer,
(b) providing the heatable coating on a surface of the outer pane or of the inner pane or on a carrier film,
(c) introducing the isolating lines (L) into the heatable coating,
(d) contacting the heatable coating to the first and second busbars,
(e) arranging the intermediate layer between the outer pane and the inner pane and
(f) bonding the outer pane to the inner pane via the intermediate layer by lamination.

13. A heatable laminated side glazing side pane according to claim 1 applied to a transportation vehicle for travel on land, in the air, or on water.

14. A heatable laminated side glazing according to claim 3, wherein a distance between adjacent isolating lines (L) in the upper part is constant or variable from the second lateral side edge to the first lateral side edge and is between 1 mm to 100 mm.

15. A heatable laminated side glazing according to claim 3, wherein a distance between adjacent isolating lines (L) in the upper part is constant or variable from the second lateral side edge to the first lateral side edge and is between 1 mm to 50 mm.

16. A heatable laminated side glazing according to claim 3, wherein the distance between adjacent isolating lines (L) in the upper part is constant or variable from the second lateral side edge to the first lateral side edge and is between 1 mm to 30 mm.

17. A heatable laminated side glazing according to claim 1, wherein a distance of the first and second busbars from the first lateral side edge and the second lateral side edge is respectively greater than 5 mm.

18. A heatable laminated side glazing according to claim 1, wherein a width of the first and second busbars is from 2 mm to 10 mm.

19. A heatable laminated side glazing side pane according to claim 1, applied to a motor vehicle.

20. A heatable laminated side glazing according to claim 9, wherein the heatable coating comprises two or three electrically conductive layers.

* * * * *